(12) United States Patent
Acervo et al.

(10) Patent No.: US 10,994,654 B2
(45) Date of Patent: May 4, 2021

(54) REAR PRE-CRASH FLASHING HAZARD LAMP SYSTEM

(71) Applicants: Continental Automotive GmbH, Hannover (DE); Toyota Jidosha Kabushiki Kaisha, Aichi (JP)

(72) Inventors: Gladys Acervo, Kanagawa (JP); Koji Takeuchi, Aichi (JP)

(73) Assignees: Continental Automotive GmbH, Hannover (DE); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 16/621,598

(22) PCT Filed: Aug. 11, 2017

(86) PCT No.: PCT/EP2017/070486
§ 371 (c)(1),
(2) Date: Dec. 11, 2019

(87) PCT Pub. No.: WO2018/228711
PCT Pub. Date: Dec. 20, 2018

(65) Prior Publication Data
US 2020/0172011 A1 Jun. 4, 2020

(30) Foreign Application Priority Data
Jun. 12, 2017 (WO) .................. PCT/EP2017/064316

(51) Int. Cl.
B60Q 9/00 (2006.01)
G01S 7/41 (2006.01)
(Continued)

(52) U.S. Cl.
CPC ............ *B60Q 9/008* (2013.01); *B60R 19/483* (2013.01); *B60R 21/0134* (2013.01); *G01S 7/41* (2013.01);
(Continued)

(58) Field of Classification Search
CPC ... B60Q 9/008; B60R 19/483; B60R 21/0134; G01S 7/41; G01S 13/931;
(Continued)

(56) References Cited

U.S. PATENT DOCUMENTS

2001/0040065 A1 11/2001 Takagi et al.
2002/0105416 A1 8/2002 Kore
(Continued)

FOREIGN PATENT DOCUMENTS

DE 10 2004 062 497 A1 7/2006
DE 10 2005 062 274 A1 6/2007
(Continued)

*Primary Examiner* — Brian Wilson
(74) *Attorney, Agent, or Firm* — Christensen O'Connor Johnson Kindness PLLC

(57) ABSTRACT

A rear pre-crash safety system of a vehicle comprising a judgement logic adapted to issue at least one collision warning signal in response to a detected radar signal reflected by an object approaching the vehicle from behind depending on a radar cross section, RCS, of the approaching object and depending on a velocity of the approaching object relative to the respective vehicle.

13 Claims, 3 Drawing Sheets

(51) Int. Cl.
*G01S 13/931* (2020.01)
*G08G 1/16* (2006.01)
*B60R 19/48* (2006.01)
*B60R 21/0134* (2006.01)

(52) U.S. Cl.
CPC ............ *G01S 13/931* (2013.01); *G08G 1/166* (2013.01); *G01S 2013/9321* (2013.01); *G01S 2013/93272* (2020.01)

(58) Field of Classification Search
CPC .. G01S 2013/93272; G01S 2013/9321; G08G 1/166
See application file for complete search history.

(56) References Cited

U.S. PATENT DOCUMENTS

| | | | |
|---|---|---|---|
| 2003/0011507 A1* | 1/2003 | Kondo | G01S 13/426 342/70 |
| 2003/0227199 A1* | 12/2003 | Yoshizawa | B60R 21/01562 297/216.12 |
| 2007/0152803 A1 | 7/2007 | Huang et al. | |
| 2009/0312916 A1 | 12/2009 | Rao | |
| 2015/0348417 A1* | 12/2015 | Ignaczak | G08G 1/166 340/435 |
| 2016/0023624 A1* | 1/2016 | Schaaf | B60R 19/03 293/117 |
| 2019/0011547 A1* | 1/2019 | Han | G01S 13/931 |

FOREIGN PATENT DOCUMENTS

| | | |
|---|---|---|
| DE | 10 2008 048 436 A1 | 3/2010 |
| EP | 1 332 910 A1 | 8/2003 |
| EP | 1 345 044 A1 | 9/2003 |
| WO | 97/44216 A1 | 11/1997 |
| WO | 99/08902 A1 | 2/1999 |
| WO | 2007/110654 A1 | 10/2007 |
| WO | 2009/043418 A1 | 4/2009 |
| WO | 2009/131875 A2 | 10/2009 |
| WO | 2016/075117 A1 | 5/2016 |

* cited by examiner

REAR PRE-CRASH FLASHING HAZARD LAMP SYSTEM

FIELD

The present disclosure relates to a rear pre-crash safety system of a vehicle, in particular a car.

BACKGROUND

A wide range of technologies has been designed to ensure the safety of passengers of a vehicle. The focus of passive safety systems has been to design a car body which is adapted to absorb the potentially high energy which is generated by a collision with another object. These passive safety systems comprise for instance seat belts and airbags. Increasingly, advanced active pre-crash safety systems are used in vehicles. With these active safety systems, other vehicles, obstacles, pedestrians or any other kinds of objects in the vehicle's path and/or vehicle's vicinity are detected to trigger a reaction of the vehicle, in particular to avoid a collision with the other object. The rear pre-crash safety system can use a radar signal reflected by another object approaching the vehicle from behind to trigger an activator such as a hazard light warning the driver of the approaching vehicle. Accordingly, conventional rear pre-crash systems can issue warning signals in case that another object is approaching the vehicle from behind. However, in many scenarios unwanted rear pre-crash system, RPCS, warning signals are issued or generated by the rear pre-crash system. For instance, in a stop and go traffic scenario, a motorcycle that does pass through small gaps between vehicles triggers an unwanted RPCS warning signal although no collision with the approaching motorcycle will happen.

SUMMARY

Accordingly, it is an object of the present disclosure to provide a system and a method to avoid unwanted RPCS warning signals.

This object is achieved according to a first aspect of the present disclosure by a rear pre-crash safety system comprising features disclosed herein.

The present disclosure provides according to the first aspect a rear pre-crash safety system of a vehicle comprising a judgement logic adapted to issue at least one collision warning signal in response to a detected radar signal reflected by an object approaching the vehicle from behind depending on a radar cross section of the approaching object and depending on a velocity of the approaching object relative to the respective vehicle.

In a possible embodiment of the rear pre-crash safety system according to the first aspect of the present disclosure, if the radar cross section of the approaching object and/or the relative velocity of the approaching object are below configurable threshold values the collision warning signal is suppressed by the judgement logic.

In a still further possible embodiment of the rear pre-crash safety system according to the first aspect of the present disclosure, in a stop and go traffic situation, the radar cross section of a following object following behind the vehicle is kept in a standstill condition and refreshed whenever the velocity of the following object relative to the vehicle is detected.

In a still further possible embodiment of the rear pre-crash safety system according to the first aspect of the present disclosure, in the stop and go traffic situation, a collision warning signal in response to a detected radar signal reflected by a further object besides the following object approaching the vehicle from behind is suppressed by the judgement logic.

In a still further possible embodiment of the rear pre-crash safety system according to the first aspect of the present disclosure, the at least one collision warning signal comprises a first collision warning signal transmitted by a flashing hazard lamp of the vehicle to warn a driver of an approaching vehicle and/or a second collision warning signal issued by the judgement logic to warn the driver and/or passengers of the vehicle about the approaching object.

In a further possible embodiment of the rear pre-crash safety system according to the first aspect of the present disclosure, a radar device installed in a rear bumper of the vehicle is adapted to detect a radar signal reflected by an object approaching the vehicle from behind.

In a still further possible embodiment of the rear pre-crash safety system according to the first aspect of the present disclosure, the collision warning signal is suppressed by the judgement logic if the radar cross section of the approaching object is below $-5$ dB$_{sm}$ and the velocity of the approaching object relative to the respective vehicle is below 15 km/h.

In a further possible embodiment of the rear pre-crash safety system according to the first aspect of the present disclosure, an object approaching the vehicle from behind is classified depending on the radar cross section of the approaching object and/or the relative velocity of the approaching object.

In a still further possible embodiment of the rear pre-crash safety system according to the first aspect of the present disclosure, the approaching object comprises a traffic participant including a truck, a car, a motorbike, a bicycle, and/or a pedestrian.

In a further possible embodiment of the rear pre-crash safety system according to the first aspect of the present disclosure, the collision warning signal issued by the judgement logic triggers automatically a control signal for an activator, in particular a pre-crash headrest activation signal.

The disclosure further provides according to a further second aspect a method for providing a collision warning signal.

The disclosure provides according to the second aspect a method for providing a collision warning signal by a rear pre-crash safety system of a vehicle, the method comprising the steps of: detecting a radar signal reflected by an object approaching the vehicle from behind by a radar device of said vehicle and generating automatically a collision warning signal depending on a radar cross section of the approaching object and the velocity of the approaching object relative to the vehicle.

In a possible embodiment of the method according to the second aspect of the present disclosure, if the radar cross section of the approaching vehicle and/or the relative velocity of the approaching object are below configurable threshold values the collision warning signal is automatically suppressed.

In a further possible embodiment of the method according to the second aspect of the present disclosure, in a stop and go traffic situation, the radar cross section of a following object following the vehicle is kept in a standstill condition and refreshed whenever a velocity of the following object relative to the vehicle is detected.

In a further possible embodiment of the method according to the second aspect of the present disclosure, in the stop and go traffic situation, a collision warning signal in response to a detected radar signal reflected by a further object besides the following object approaching the vehicle from behind is automatically suppressed.

In a further possible embodiment of the method according to the second aspect of the present disclosure, the at least one collision warning signal comprises a first collision warning signal transmitted by a flashing hazard lamp of the vehicle to warn a driver of an approaching vehicle and/or a second collision warning signal issued automatically to the driver and/or passengers of the vehicle to warn them about the approaching object.

BRIEF DESCRIPTION OF THE DRAWINGS

In the following, possible embodiments of the different aspects of the present disclosure are described in more detail with reference to the enclosed figures.

DETAILED DESCRIPTION

Figure 1:
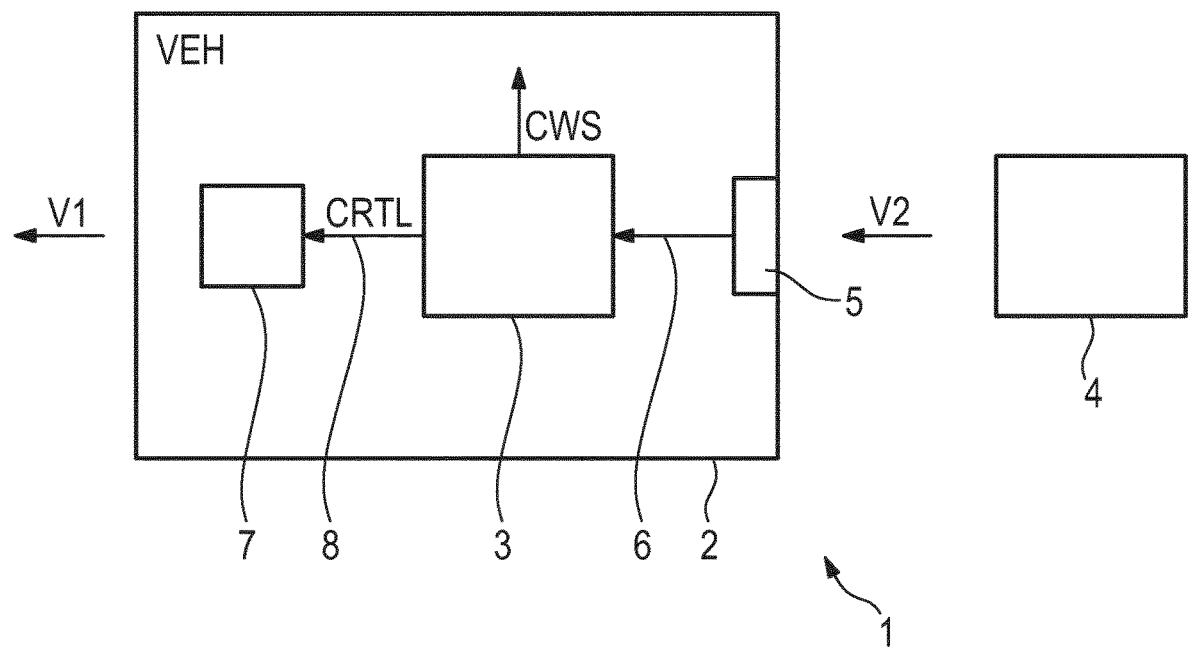
FIG. 1 shows a schematic block diagram for illustrating a possible exemplary embodiment of a rear pre-crash safety system of a vehicle according to the first aspect of the present disclosure.

As can be seen in FIG. 1, a rear pre-crash safety system 1 according to the first aspect of the present disclosure can be implemented in a vehicle 2 driving with a velocity V1 on a road. The vehicle 2 can be for instance a car or truck driving on a road with a velocity V1.

The rear pre-crash safety system 1 of the vehicle 2 comprises in the illustrated embodiment a judgement logic 3. The judgement logic 3 is adapted to issue at least one collision warning signal CWS in response to a detected radar signal reflected by an object 4 approaching the vehicle 2 from behind as illustrated in FIG. 1. The judgement logic 3 is adapted to issue the at least one collision warning signal CWS in response to the detected radar signal reflected by the object 4 approaching the vehicle 2 from behind depending on a radar cross section RCS of the approaching object 4 and depending on a velocity of the approaching object 4 relative to the respective vehicle 2.

In the illustrated example of FIG. 1, the approaching object 4 moves with a velocity V2 towards the direction of the preceding vehicle 2 wherein the velocity V2 is higher than the velocity V1 of the vehicle 2. The relative velocity is the difference between the velocity V2 of the object 4 and the velocity V1 of the vehicle 2.

In a possible embodiment, the relative velocity of the approaching object 4 can be detected by the judgement logic 3 on the basis of sensor signals. In a further possible embodiment, the relative velocity between the approaching object 4 and the moving vehicle 2 can also be derived from the reflected radar signal.

As shown in FIG. 1, the vehicle 2 comprises in the illustrated embodiment, a radar device 5 which can be installed in a possible implementation in a rear bumper of the vehicle 2. The radar device 5 is adapted to detect a radar signal reflected by the object 4 approaching the vehicle 2 from behind. The radar device 5 supplies the detected radar signal via a signal line 6 to the judgement logic 3 of the rear pre-crash safety system 1.

In the illustrated embodiment of FIG. 1, the judgement logic 3 can control at least one activator 7 via a control signal line 8. In a possible embodiment, a control signal issued by the control logic 3 can trigger automatically a control signal supplied to an activator 7. The activator 7 can in a possible implementation comprise a pre-crash headrest system. The pre-crash headrest system is used to reduce a whiplash injury of a passenger of the vehicle 2. The pre-crash headrest system achieves this instantaneously when a rear end collision is judged as unavoidable by the judgement logic 3 by moving the headrest forward toward the head of an occupant before the collision occurs. When the collision judgement logic 3 detects an unavoidable collision, it can transmit a pre-crash headrest activation signal to a headrest control unit 7.

In a possible embodiment, if the radar cross section RCS of the approaching object 4 and/or the relative velocity of the approaching object 4 are below configurable threshold values a collision warning signal CWS is suppressed by the judgement logic 3. Accordingly, objects having a small radar cross section RCS and/or moving with a low relative velocity do not trigger an unwanted collision warning signal. For instance, in a stop and go traffic situation, the radar cross section RCS of a following object following the vehicle 2 from behind is kept in a standstill condition and only refreshed whenever the velocity of the following object relative to the vehicle 2 is detected. In this stop and go traffic situation, the collision warning signal CWS in response to a detected radar signal reflected by a further object besides the following object approaching the vehicle 2 from behind can be suppressed by the judgement logic 3.

The judgement logic 3 of the rear pre-crash safety system 1 of the vehicle 2 can issue one or several collision warning signals CWS in response to a detected radar signal reflected by an approaching object. The collision warning signal CWS can comprise a first collision warning signal which can be transmitted by a flashing hazard lamp of the vehicle 2 and warn a driver of an approaching vehicle 4. The flashing hazard lamp can be provided at the rear of the vehicle's 2 chassis.

The collision warning signal can further comprise a second collision warning signal issued by the judgement logic 3 to warn the driver and/or other passengers of the vehicle 2 about the approaching object and/or imminent collision. In a possible implementation, the second collision warning signal can depend on the detected radar cross section RCS of the approaching object 4 and/or depend on the relative velocity of the approaching object 4. For instance, an approaching object 4 of considerable size with a high radar cross section RCS approaching the vehicle 2 from behind with a high relative velocity causes a different collision warning signal CWS than a small approaching object with a small RCS having a low relative velocity.

The second collision warning signal CWS can comprise in a possible embodiment an acoustic signal output by a loud-speaker of the vehicle 2 to the passengers and/or driver of the vehicle 2 within the passenger room. In a possible embodiment, a frequency and/or amplitude of the generated second collision warning signal CWS can depend on the radar cross section RCS of the approaching object 4 and/or depending on the relative velocity of the approaching object 4.

In a possible embodiment, the collision warning signal CWS is automatically suppressed by the judgement logic 3 of the vehicle 2 if the radar cross section RCS of the approaching object 4 and the relative velocity of the approaching object 4 relative to the vehicle 2 is below configurable threshold values. In a specific implementation, the collision warning signal can be suppressed by the judgement logic 3 if the radar cross section of the approaching object 4 is below −5 $dB_{sm}$ and the velocity of the approaching object 4 relative to the respective vehicle 2 is below 15 km/h.

In a possible implementation, the threshold values are stored in a configuration memory which can be adapted by means of a configuration interface. In a possible embodiment, the threshold values can be configured according to safety criteria and/or safety requirements of the vehicle 2 and/or the persons transported in the vehicle 2. For example, if the vehicle 2 is a truck transporting inflammable materials or fuels the threshold values can be configured differently than for a normal car or truck.

The judgement logic 3 of the rear pre-crash safety system 1 can control at least one activator 7 in response to the RCS and/or relative velocity of the approaching vehicle 4. For instance, if the relative velocity between the approaching vehicle or object 4 and the vehicle 2 is higher than a preset threshold value, the judgement logic 3 can control a motor 7 of the vehicle 2 to increase the velocity V1 of the vehicle 2 to either avoid a collision or an impact and/or to at least diminish the relative velocity when the approaching object 4 collides with the rear front of the vehicle's 2 chassis.

In a further possible embodiment, an object 4 approaching the vehicle 2 from behind is classified depending on the radar cross section of the approaching object 4 and/or the relative velocity of the approaching object 4. For instance, an approaching object 4 with a relative small radar cross section RCS but a high relative velocity can be classified as a motorbike. Further, when the vehicle 2 is standing in a traffic jam and has a velocity V1=0 and an object with a low RCS is approaching the vehicle 2 with a relatively small velocity, the object can be classified as a pedestrian. In a still further possible embodiment, additional sensor data can be used for the classification of the approaching object 4.

In general, the approaching object 4 can comprise any kind of traffic participant including a truck, a car, a motorbike, a bicycle and/or a pedestrian.

Figure 2:
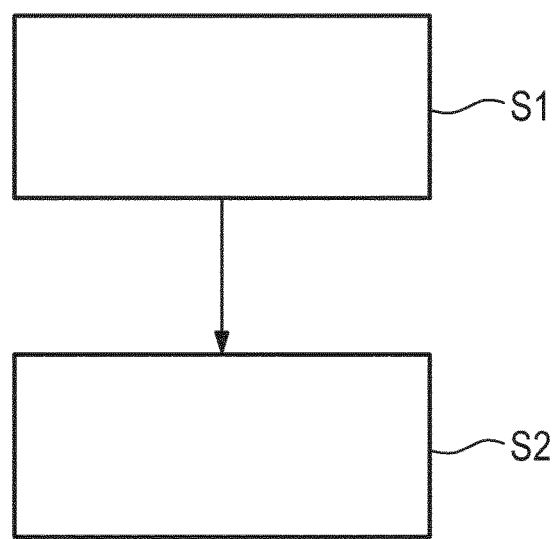
FIG. 2 shows a flowchart illustrating a possible exemplary embodiment of a method for providing a collision warning signal according to the second aspect of the present disclosure.

FIG. 2 shows a flowchart of a possible exemplary embodiment of a method for providing a collision warning signal for a rear pre-crash safety system 1 of a vehicle 2. In the illustrated embodiment, the method comprises two main steps.

In a first step S1, a radar signal reflected by an object approaching the vehicle from behind is detected by a radar device of the vehicle.

In a further step S2, a collision warning signal is automatically generated depending on a radar cross section RCS of the approaching object and the velocity of the approaching object relative to the vehicle.

If the radar cross section RCS of the approaching vehicle 4 or object and/or the relative velocity of the approaching object 4 are below configurable threshold values, the collision warning signal CWS generated in step S2 is automatically suppressed.

In a stop and go traffic situation, the radar cross section RCS of the following object following the vehicle 2 is kept in a standstill condition and refreshed whenever a velocity of the following object relative to the vehicle 2 is detected.

In the stop and go traffic situation, a collision warning signal CWS in response to a detected radar signal reflected by a further object besides the following object approaching the vehicle 2 from behind can be automatically suppressed.

The at least one collision warning signal CWS can comprise a first collision warning signal CWS transmitted by a flashing hazard lamp of the vehicle 2 to warn a driver of the approaching vehicle and/or a second collision warning signal CWS issued automatically to the driver and/or passengers of the vehicle to warn them about the approaching object 4.

In a possible embodiment of the rear pre-crash safety system 1 according to the first aspect of the present disclosure, the judgement logic 3 can use a detection radar from a millimeter wave radar system to calculate an estimated path of vehicles approaching the vehicle from the rear. The detected signal can be used to estimate a time to collision TTC. The time to collision TTC can be calculated in a possible embodiment by dividing the distance to the approaching object 4 from the rear by its relative velocity. In a possible embodiment, at least one activator 7 of the vehicle 2 is controlled depending on the calculated time to collision TTC.

Figure 3:
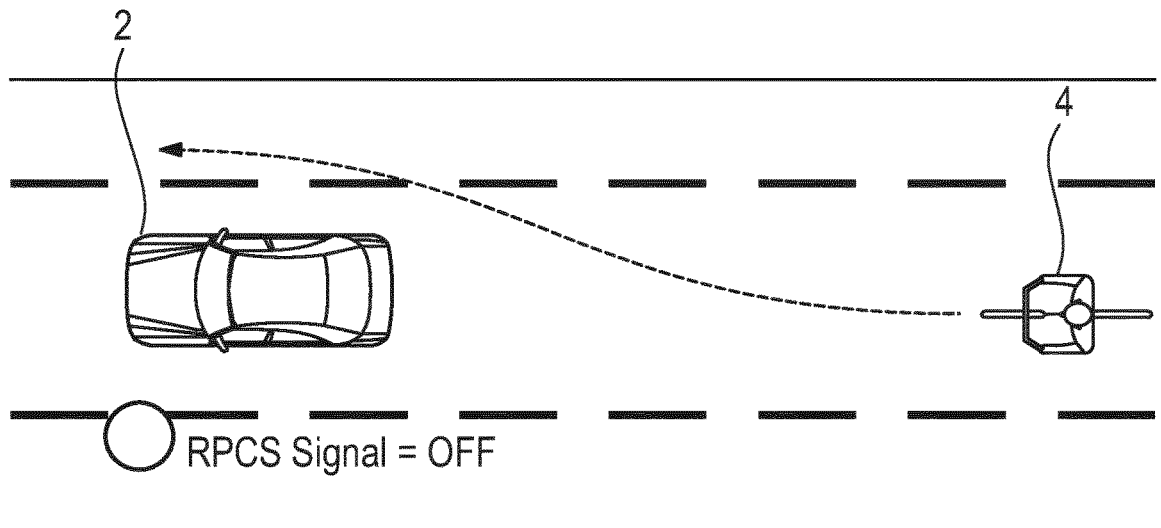
FIG. 3 shows a schematic diagram for illustrating a possible traffic scenario where the method and system according to the present disclosure can be used.

FIG. 3 shows schematically a possible traffic scenario where the rear pre-crash safety system 1 according to the first aspect of the present disclosure can be employed. In public roads, for instance, often small-structured vehicles are abundant. Small-structured vehicles such as motorcycles can travel more flexibly than vehicles or cars and tend to have relatively high velocities. Accordingly, conventional rear pre-crash systems tend to issue warning signals in response to approaching motorcycles as illustrated in FIG. 3. Small-structured vehicles such as motorcycles comprise a low value of radar cross section RCS because they comprise fewer reflective materials and are smaller in structure than conventional passenger cars.

In a possible embodiment, the judgement logic 3 can use a truth table used in order to sort out low RCS value objects from those objects in the vicinity of the vehicle 2 comprising middle or high RCS values. In a possible embodiment, the judgement logic 3 can, based on the stored truth table, not issue any warning signal when the RCS value of the respective object is below −5 $db_{sm}$ and its relative speed is lower than 15 km/h. In the illustrated scenario of FIG. 3, the approaching object 4 is a motorcycle with a low radar cross section RCS approaching car 2 from behind. The rear pre-crash safety system 1 of the car 2 can suppress in the illustrated exemplary traffic situation a collision warning signal CWS because the motorcycle 4 can drive around the vehicle 2 as illustrated in FIG. 3.

Figure 4:
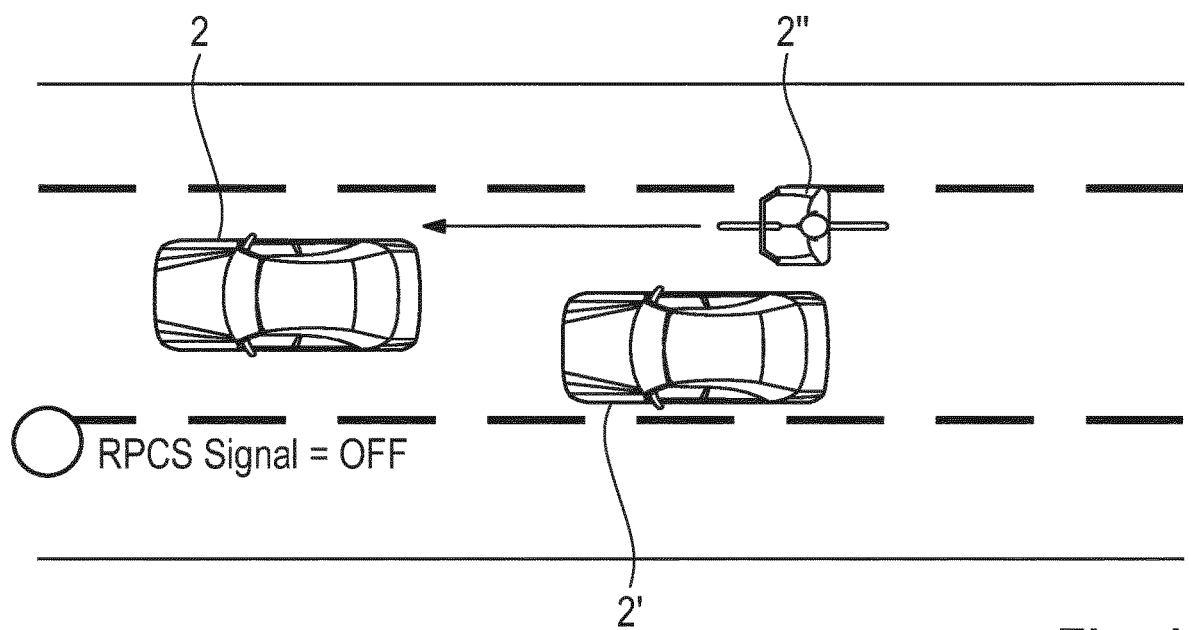
FIG. 4 shows a further schematic diagram for illustrating a further exemplary traffic scenario where the system and method according to the present disclosure can be used.

FIG. 4 shows a further possible traffic scenario where the rear pre-crash safety system 1 and the method according to the present disclosure can be used. In the illustrated traffic scenario, the vehicle 2 is in a stop and go traffic situation. In this kind of traffic scenario, sometimes another vehicle 2' behind the subject vehicle 2 can disappear on the radar field of view, FOV. When the following vehicle does disappear from the radar FOV, there is a chance that high-speed small-structured vehicles such as motorcycles can pass through small gaps between vehicles standing in a stop and go traffic jam. These high-speed small-structured vehicles are identified as potential RPCS targets or objects approaching the vehicle 2. In the illustrated traffic scenario 4, the further object 2" is a small-structured vehicle passing through gaps between cars standing in the traffic jam. The motorcycle 2" passing through the small gaps between standing vehicles 2, 2' can cause an unwanted RPCS warning signal issued by the judgement logic 3 of the vehicle 2.

In a possible embodiment, in the stop and go traffic situation as illustrated in FIG. 4, the radar cross section RCS of a following object 2" following the vehicle 2 is kept and only refreshed whenever a velocity of the following object 2" relative to the vehicle 2 is detected. The rear pre-crash safety system 1 keeps the data of the vehicle 2' behind the vehicle 2 whenever there is a standstill condition. While this data is being kept a warning signal is suppressed for all other incoming objects or vehicles such as the small-structured motorcycle 2". The rear pre-crash safety system does refresh its data whenever it detects that the vehicle or object behind 2' comprises a velocity relative to the vehicle 2. Accordingly, in a stop and go traffic situation as shown in FIG. 4, a collision warning signal CWS in response to a detected radar signal reflected by a further object 2" besides the following object 2' approaching the vehicle 2 from behind is automatically suppressed.

Figure 5:
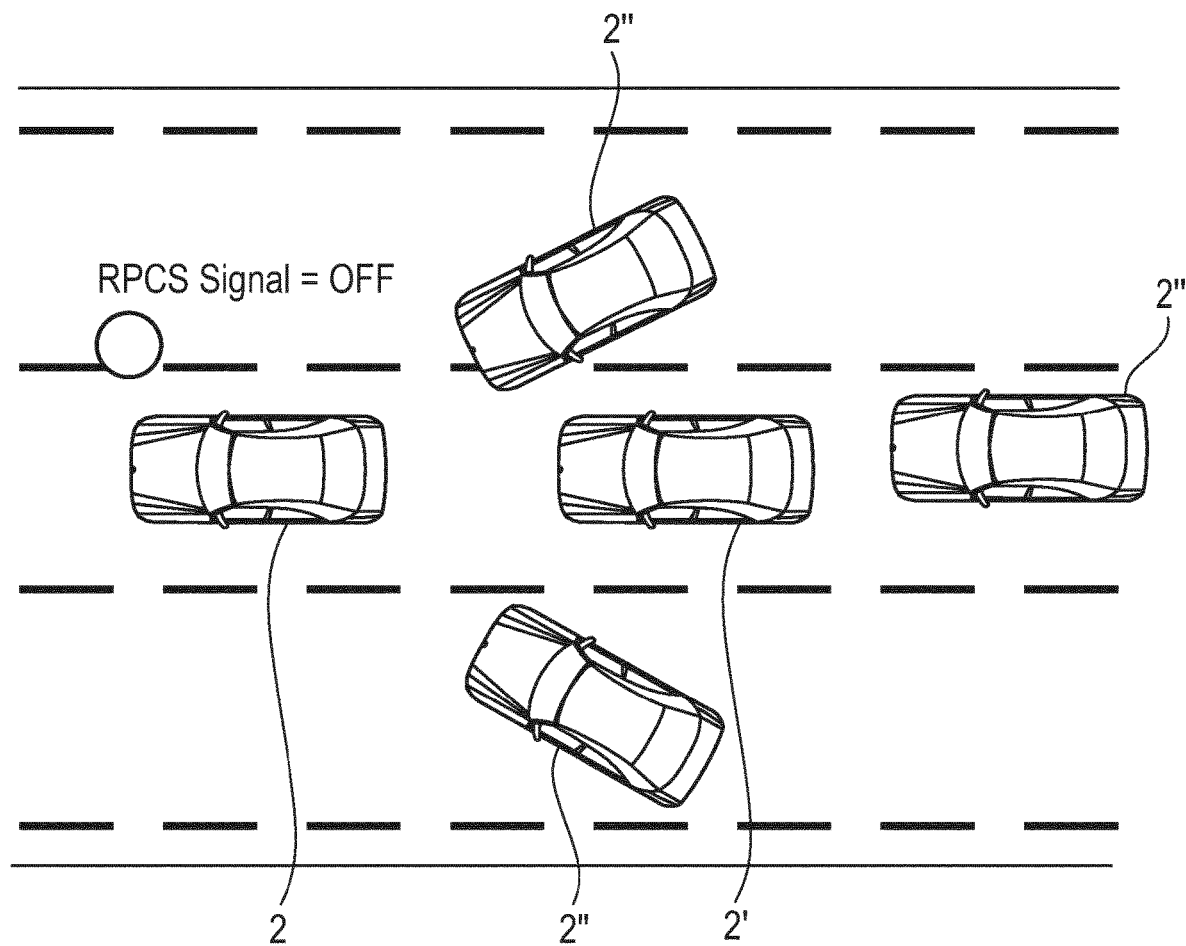
FIG. 5 shows a further schematic diagram for illustrating a possible exemplary traffic scenario where the method and system according to the present disclosure can be used.

FIG. 5 shows a further possible exemplary traffic situation where a rear pre-crash safety system 1 and a method according to the present disclosure can be used. In a possible situation, a following vehicle 2' following the vehicle 2 can disappear in a standstill traffic scenario. In this case, other vehicles 2" as shown in FIG. 5 coming from different directions can be classified as a potential target. These other vehicles 2" would trigger in a conventional rear pre-crash safety system an unwanted PRCS warning signal. In an embodiment of the rear pre-crash safety system 1 according to the present disclosure, if the system recognizes that there is a vehicle 2" behind the vehicle 2 the system can mark it as a following object or following vehicle and keep the following vehicle detection even if the vehicle disappears from the radar FOV. The system can keep the data of the following vehicle 2' behind the vehicle 2 in a standstill traffic condition. While this data is being kept, a warning signal will be suppressed by the judgement logic 3 for any other vehicle 2" coming from any direction. The system can refresh its data whenever it detects that the vehicle behind comprises a relative velocity.

With the method and system according to the present disclosure, a collision warning signal CWS is only generated for relevant objects approaching the vehicle from behind. This can be performed depending on its radar cross section RCS and/or its relative velocity. In an embodiment, if the radar cross section RCS of the approaching object or the relative velocity of the approaching object are below threshold values, the collision warning signal CWS is automatically sup pressed. Consequently, unwanted and unnecessary collision warning signals are avoided. Therefore, a driver of the vehicle 2 and/or a driver of an approaching vehicle 2' are only warned in relevant traffic scenarios. Further, necessary countermeasures are only initiated in relevant traffic scenarios where a collision of an approaching object 4 is possible.

The invention claimed is:

1. A rear pre-crash safety system of a vehicle comprising a judgement logic adapted to issue at least one collision warning signal in response to a detected radar signal reflected by an object approaching the vehicle from behind depending on a radar cross section, RCS, of the approaching object and depending on a velocity of the approaching object relative to the respective vehicle,
   wherein in a stop and go traffic situation, the radar cross section, RCS, of a following object following behind the vehicle is kept at a fixed data value in a case where the vehicle is in a standstill condition and only refreshed whenever a velocity of the following object relative to the vehicle is detected.

2. The rear pre-crash safety system according to claim 1 wherein if the radar cross section, RCS, of the approaching object and/or the relative velocity of the approaching object are below configurable threshold values the collision warning signal is suppressed by said judgement logic.

3. The rear pre-crash safety system according to claim 2 wherein the collision warning signal is suppressed by the judgement logic if the radar cross section, RCS, of the approaching object is below $-5$ $dB_{sm}$ and the velocity of the approaching object relative to the respective vehicle is below 15 km/h.

4. The rear pre-crash safety system according to claim 1 wherein in the stop and go traffic situation, a collision warning signal in response to a detected radar signal reflected by a further object besides the following object approaching the vehicle from behind is suppressed by said judgement logic.

5. The rear pre-crash safety system according to claim 1 wherein the at least one collision warning signal comprises a first collision warning signal transmitted by a flashing hazard lamp of the vehicle to warn a driver of an approaching vehicle and/or a second collision warning signal issued by the judgement logic to warn the driver and/or passengers of the vehicle about the approaching object.

6. The rear pre-crash safety system according to claim 1 wherein a radar device installed in a rear bumper of the vehicle is adapted to detect the radar signal reflected by the object approaching the vehicle from behind.

7. The rear pre-crash safety system according to claim 1 wherein the object approaching the vehicle from behind is classified depending on the radar cross section, RCS, of the approaching object and/or the relative velocity of the approaching object.

8. The rear pre-crash safety system according to claim 1 wherein the approaching object comprises a traffic participant including a truck, a car, a motorbike, a bicycle, and/or a pedestrian.

9. The rear pre-crash safety system according to claim 1 wherein the collision warning signal issued by the judgement logic triggers automatically a control signal for an activator comprising a pre-crash headrest activation signal.

10. A method for providing a collision warning signal by a rear pre-crash safety system of a vehicle, the method comprising the steps of:
    (a) detecting a radar signal reflected by an object approaching the vehicle from behind by a radar device of said vehicle; and
    (b) generating automatically the collision warning signal depending on a radar cross section, RCS, of the approaching object and velocity of the approaching object relative to said vehicle,
    wherein in a stop and go traffic situation, the radar cross section, RCS, of a following object following the vehicle is kept at a fixed data value in a case where the vehicle is in a standstill condition and only refreshed whenever a velocity of the following object relative to the vehicle is detected.

11. The method according to claim 10 wherein if the radar cross section, RCS, of the approaching object and/or the relative velocity of the approaching object are below configurable threshold values the collision warning signal is automatically suppressed.

12. The method according to claim 10 wherein in the stop and go traffic situation, a collision warning signal in response to a detected radar signal reflected by a further object besides the following object approaching the vehicle from behind is automatically suppressed.

13. The method according to claim 10 wherein the collision warning signal comprises a first collision warning signal transmitted by a flashing hazard lamp of the vehicle to warn a driver of an approaching vehicle and/or a second collision warning signal issued automatically to the driver and/or passengers of the vehicle to warn them about the approaching object.

* * * * *